P. P-G. HALL.
PLANETARY METAL WORKING MACHINE.
APPLICATION FILED JUNE 7, 1918.

1,316,718.

Patented Sept. 23, 1919.
5 SHEETS—SHEET 4.

WITNESS
F. J. Hartman.

INVENTOR
Peter P-G. Hall.
BY
ATTORNEYS

P. P-G. HALL.
PLANETARY METAL WORKING MACHINE.
APPLICATION FILED JUNE 7, 1918.

1,316,718.

Patented Sept. 23, 1919.
5 SHEETS—SHEET 5.

INVENTOR
Peter P-G. Hall.

WITNESS
F. G. Hartman.

BY

ATTORNEYS

UNITED STATES PATENT OFFICE.

PETER P-G. HALL, OF PHILADELPHIA, PENNSYLVANIA.

PLANETARY METAL-WORKING MACHINE.

1,316,718.     Specification of Letters Patent.     Patented Sept. 23, 1919.

Application filed June 7, 1918. Serial No. 238,754.

*To all whom it may concern:*

Be it known that I, PETER P-G. HALL, a citizen of the United States, and a resident of Philadelphia, in the county of Philadelphia, State of Pennsylvania, have invented a certain new and useful Planetary Metal-Working Machine, of which the following is a specification.

This invention relates to a novel planetary metal working machine capable in one of its uses to operate as a thread milling mechanism adapted to cut all the threads in a piece of work during a single relative circuit between a plurality of cutting tools and the work or by a plurality of circuits with a single cutter to make a continuous screw therein, the mechanism so constructed as to adapt the device not only to the use of forming external or internal threads on a piece of work—in which either the work of the mechanism may move, or in which a compound movement may be effected by a movement of both the work and the mechanism—but also to adapt the device for milling generally as well as performing drilling, boring and other machine tool operations. The object of the invention, in its broader concept, is to provide a novel association of means capable of a wide range of uses, as indicated, in which a mechanism is arranged so that there may be a relative helical movement between a rotating cutter and the work operated upon to facilitate, in one instance, the cutting of threads by making a plurality of threads simultaneously, or, in another case, the milling or boring of a surface, such as that of a cylinder, relatively rapidly.

Moreover, it is an object of one phase of my invention to provide such a mechanism capable of such variety of uses, in which the device may be readily arranged as desired, to obtain external or internal threads on varying diameters; to obtain threads of various pitches; and to obtain threads of various depths, and my invention has for its further object to provide a mechanism of this character which may be partially controlled by hand or which will be completely automatic in its operation, bringing the tool to initial cutting position relative to the work, performing the operation thereon, releasing and then returning the operative elements of the mechanism to initial starting position.

I have found that in carrying my invention into practice the use of an eccentric mounting has proven very satisfactory as a means to obtain a planetary movement of revolution between a rotary cutting tool and the work being operated upon, in which either the work or tool may be given a relative longitudinal feed to obtain the pitch of the thread. Moreover, such eccentric mounting is adapted to facilitate a transverse relative movement between the tool and the work to bring the same into initial cutting position, and to facilitate a further transverse movement to cause the cutter to enter the work a distance to obtain the depth of the thread—and any of these various operations may be readily effected manually or automatically. Furthermore, if this eccentricity be used in the mechanism, the same particularly facilitates the adjustment of the mechanism for cutting internal or external threads of various diameters and renders the device capable of further advantages in the arrangement of the operating elements thereof, as well as the simplicity of the entire construction, for example, such as the manner in which the driving power is applied to the operating tool.

It is to be understood that my invention is not limited to the association of means, or use and arrangement of parts suggested herein, but that the same is capable of a wide range of use, material rearrangements of parts and radically different associations of means—which will be readily apparent to those skilled in the art with the disclosure made herein before them—without departing from the spirit of my invention, and the particular embodiments shown in the drawings as an exemplification of means for reducing my invention to practice, are made for the purpose of illustration merely, to comply with the statutes, and not with the purpose or intent of limiting the invention to the particular embodiments disclosed.

Figure 1 is a longitudinal sectional view with parts in elevation showing one embodiment of my invention. Fig. 2 is an end elevation with a portion in section of Fig. 1, while Fig. 5 is a longitudinal sectional view of a modification of the invention disclosed in Figs. 1, 2, 3 and 4, the embodiment illustrated in Fig. 5 being substantially entirely automatic. Fig.

6 is a detail of a part of the mechanism illustrated in Fig. 5.

The embodiment of the invention illustrated in Figs. 1, 2, 3 and 4 shows one association of means forming one embodiment of my invention in which the mechanism is used as a semi-automatic planetary thread milling mechanism adapted in this case to operate upon a stationary piece of work to mill either internal or external threads therein. Means are provided to move the tool to initial cutting position for any desired diameters; cut the proper depth to get the diameter of the threads, and give the tool a planetary and longitudinal movement to thus obtain a helical relative movement between the work and tool while the tool is rotated, either after or during the initial period of the time the tool has been moved into the work the depth of the thread. By providing the tool with a plurality of cutters, a single planetary circuit of the tool will cause a plurality of threads to be simultaneously cut in the work, or if a single cutter is used, the same may be given a plurality of circuits to obtain the same results. At the end of the cycle of operations, means may be provided to release the driving mechanism, stop the helical movement of the tool, and thereupon return the mechanism to original initial position, and certain of these latter movements may be performed either automatically or manually.

Various means could be employed to accomplish these operations and in Figs. 1, 2, 3 and 4 there is illustrated a two-part casing 10 and 11 secured to a plate 12 which slides on a keyway 13 in an adjustable bed plate 13'. Within the casing is mounted a rotatable support 15, which, in the form illustrated, is a hollow shaft or cylinder. Eccentrically mounted in the cylinder 15 is a second shaft 16 which carries eccentrically thereof the tool shaft 17, the shaft 17 extending beyond the shaft 16 and support 15 at either end thereof, as shown. This shaft 17 may be provided at one end with a rotatable cutting tool 18 and at the other end with suitable driving means, such as a pulley 19 driven by a belt 20 from a power pulley 21. As the pulley 19, in the manipulation of the mechanism, moves to different distances from the pulley 21, I have provided an automatic slack adjuster in the weight 25 for the belt 20. The weight 25 is provided with a small pulley 26 adapted to engage the belt 20 between the pulley 21 and an auxiliary pulley 28 and from an inspection of Fig. 2 it will be evident that the pulley 19 may assume different positions in the cylinder 15 and may be thus moved relatively to the pulley 21, whereupon the weight 25 in the loop of the belt between the pulleys 21 and 28 will automatically tension the belt in any of the relative positions of the pulleys. Various other types of drive for the shaft 17 could readily be employed to accommodate a movement of the driven shaft 17 relative to its source of driving power.

The rotary support or cylinder 15 is adapted to be given a helical movement to revolve the tool 17 in a planetary path and also feed the same longitudinally to effect the cutting of a plurality of threads simultaneously upon a single circuit thereof, or the cutting of several threads successively upon a plurality of circuits (as well as obtain the proper pitch of the threads in either case). One suitable combination of elements for accomplishing this end includes, as means to revolve the support 15, a gear 35 splined to the cylinder 15 by the key 36 engaging a longitudinal slot 37 in the exterior surface of the cylinder 15. Arranged transversely of the mechanism is a worm shaft 40 provided with a worm 41 adapted to drive the gear 35. The shaft 40 may be driven either by hand or by power, the same being provided with a pulley 43 at one end and a handle 44 at the other end to be used for these purposes. To feed the support 15 longitudinally there may be suitably secured to the cylinder 15 a master thread 46 to coöperate with means such as a lead nut 47 stationary with the casing of the device to engage the thread 46, such master thread and lead nut replaceable by others in accordance with the type of thread to be cut in the work. There is here shown for this purpose a two-part adjustable feed nut, which may be "standard".

Figures 3, 4:
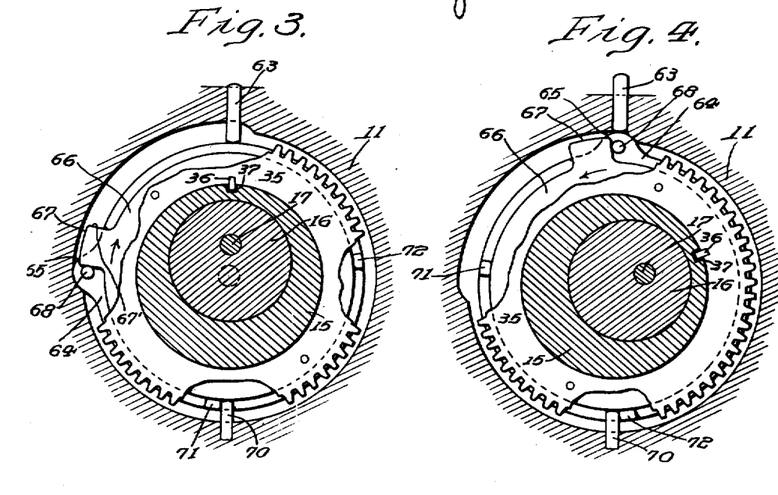
Figs. 3 and 4 are sectional views of details of the mechanism showing the parts in various operative positions.

The tool 18 revolves about the center of the cylinder 15, and, by the construction described, the tool may be moved from a normal position, such as on the dead center of the cylinder 15, as shown in dotted lines in Fig. 3 when internal threads are being cut, or a high position, shown in full lines in Fig. 3, when external threads are to be cut, to any position radially therefrom dependent upon the diameter of the threads cut in either case or the depth of the threads. Thus, in the embodiment shown in Figs. 1, 2, 3 and 4, the cutter 18 may be brought to initial cutting position by hand by a rotation of the eccentrically mounted shaft 16 which carries the shaft 17. Moreover, a rotation of this shaft also feeds the cutter 18—which is rotating—into the work the distance required for the proper diameter of the threads or the depth for the threads and, of course, the tool may operate to first mill the surface to a certain amount before the threads are cut, and then, too, the same may be fed into the work only a portion of the depth on the one end or a greater amount on the other to make flat-headed threads if desired.

Figures 1, 2:
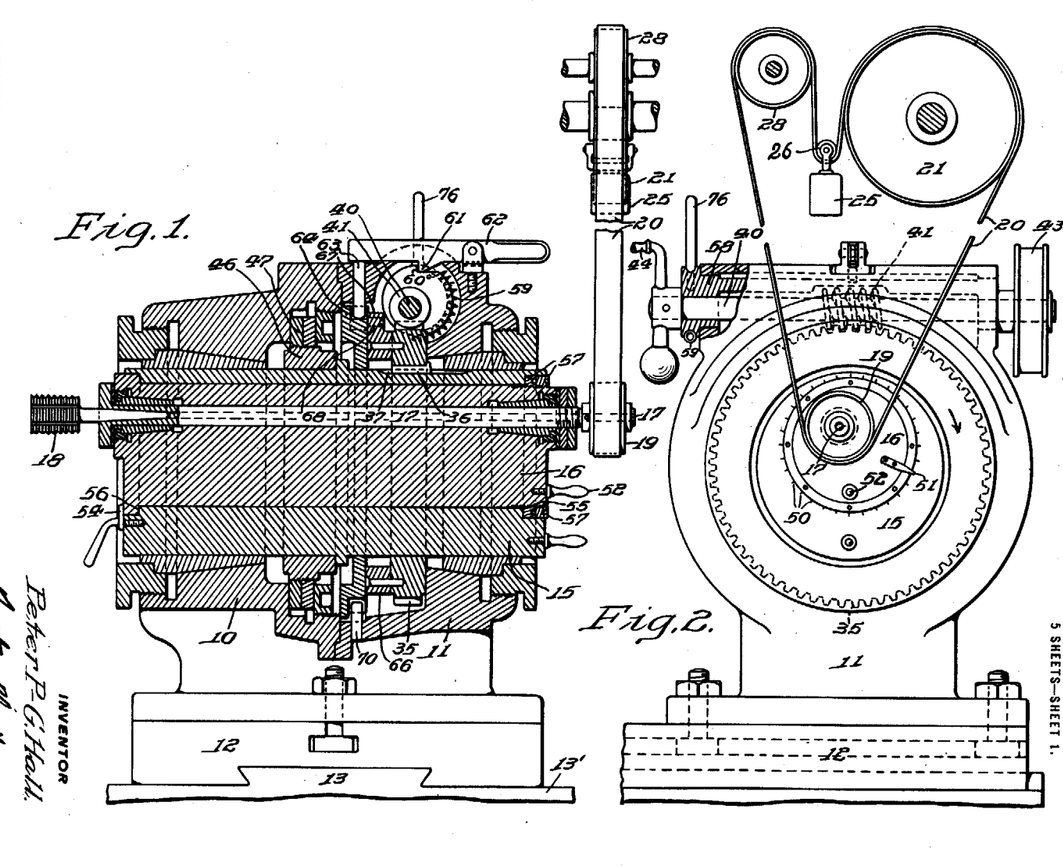

As shown in Fig. 2, the cylinder 15 is provided with a scale 50 and the shaft 16 may be provided with a pointer 51 to move thereover and ascertain the proper distance to rotate the shaft 16 to gage the transverse movement of the cutter 18. A handle 52 may be used to rotate the shaft 16 while a friction lock 54, adapted to overlie a portion of the shaft 16 and be screw threaded into the support 15, may be provided to bind or lock together the shaft 16 and support 15 when the proper position, as indicated by the pointer 51 and scale 50 for the cutter 18, has been reached. The shaft 16 is prevented from longitudinal movement in the support 15 by a shoulder 56 on one end and suitable locking rings 57 on the other. It is to be understood, however, that any type of means could be utilized for securing the cutter 18 in various positions of adjustment relative to the cylinder 15.

The release of the drive between the worm 41 and gear 35 may be manually or automatically effected when the tool and the work, in the present or in any of the embodiments illustrated herein, have made one complete relative revolution, with a certain amount of overlap or any number of revolutions, if deemed desirable. One suitable automatic releasing means may be made by mounting the worm shaft 40 eccentrically in a support or shaft 58. A spring 59 is attached to the shaft 58 and to a fixed portion of the casing of the device in such a manner as to tend to rotate the shaft 58 with the eccentric drive shaft 40 therein to thereby disengage the worm 41 from the worm gear 35. During the operation of the machine the spring is restrained by a latch mechanism from disengaging the worm and worm gear, holding them in mesh, and means are provided at the end of the cutting operation to release the latch and then permit the spring to disengage the worm and worm gear. Thus, the shaft 58 may be provided with a notch 60 adapted to be engaged by a projection 61 on the pivoted latch member 62. A pin 63 is suitably positioned so as to be automatically operated to raise the outer end of the latch 62 and release the projection 61 at the proper time during the operation of the mechanism. A cam ring 64, provided with a cam surface 65, as shown in Figs. 1, 3 and 4, is adapted to be properly operated to move the pin 63 from the position shown in Fig. 4. To these ends, one satisfactory mechanism includes a member 66 secured to the gear 35, said member being provided with an extension or projection 67 adapted to engage a laterally extending pin 68 on the cam ring 64. The projection 67, with the worm gear 35, moves in the direction of the arrow shown in Fig. 3, which shows these parts in one normal position, and, after making a complete revolution, the surface 67' of the lug 67 engages the pin 68 and carries the cam ring 64 to the position shown in Fig. 4 when the pin 63, which is riding on the surface of the cam ring, is engaged by the cam 65 and is raised to release the latch 62. If desired, a fixed stop 70 may be suitably positioned within the casing of the device and the ring 64 may be provided with a plurality of stops 71 and 72 to determine the proper initial and final positions of the cam 65. It will be noted that with the particular arrangement shown, the gear 35 and hence the cylinder 15, shaft 16, as well as the tool shaft 17 and tool 18, are given one complete revolution and a quarter revolution in addition thereto but it is to be understood that the mechanism could be stopped and the gear 40 released as soon as one complete revolution has been made with none or very little overlap if such an arrangement were deemed advisable.

The general operation of the mechanism will, it is believed, be readily understood from the foregoing. The parts may be longitudinally and transversely adjusted to bring the cutter 18 into proximity with the work to be operated upon by reason of the fact that the bed plate 13' is longitudinally adjustable and the plate 12 may also be transversely adjusted on the keyway 13. However, the mechanism may be, in certain instances, secured in fixed position on the work being operated upon, the particular arrangement whereby the tool 18 is positioned in proper relation to the work being immaterial in so far as the embodiment of my invention, illustrated in Figs. 1, 2, 3 and 4 is concerned. The worm shaft 40 is latched in position with the worm 41 engaging the worm gear 35. The shaft 16 is rotated to move the cutter 18 from either of the normal positions indicated in Fig. 3 dependent upon whether external or internal threads are being cut to initial cutting position and an additional amount to cause the cutter to enter the work to get the depth for the threads or the proper diameter of the threads being cut. The friction lock 51 is then screwed home to bind the shaft 16 in this position. It will thus be seen that this operation is substantially the same whether the cutter 18 is making external or internal threads, the only difference being that in making internal threads the shaft 17 is moved outwardly radially of the center of the cylinder 15 while in making external threads the same is moved inwardly in a curved direction. As soon as the cutter is brought to the surface of the metal in which the threads are to be milled, the shaft 17 being continuously rotated, the metal may be immediately cut the depth of the threads whereupon an operation of the worm shaft 40 gives the cutter a helical movement effected in this instance by a rotation of the cylinder 15 by the gear 35 and the longitudinal feed of the cylinder 15 by the engagement of the master threads 46 with the lead nut 47. When the cylinder 15 has made a complete revolution, the cutter 18 has likewise revolved once and been advanced the pitch of the thread. The drive worm 41 is now automatically released when the lug 67 engages the pin 68 on the cam 65 and moves the same to raise the pin 63 to release the latch 62, the spring 59 immediately rotating the driving shaft 40 in an eccentric manner to disengage the same from the worm 35.

In this position of the parts the cylinder 15 may be given a backward movement by rotating the same in the opposite direction to that in which it is driven by the worm shaft 40. Likewise, after a release of the lock 54, the shaft 16 may be rotated to move the cutter radially toward the center of the machine or outwardly therefrom as the case may be, dependent upon whether internal or external threads have just been cut. The mechanism may then be adjusted for operation on a new piece of work when the shaft 58, carrying the worm shaft 40, is turned by a handle 76 to bring the worm into engagement with the worm gear 35 and the latch 62 is thrown over into position with the lug 61 set in engagement with the shoulder 60 as has heretofore been set forth.

Figures 5, 6:
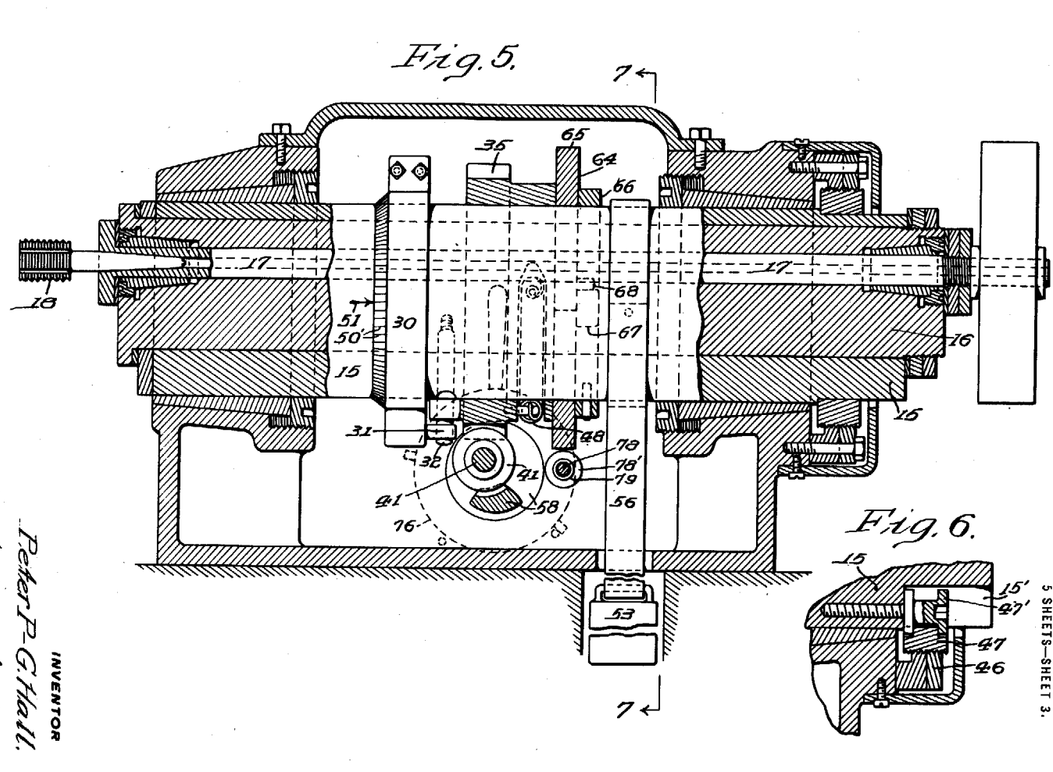
Figure 7:
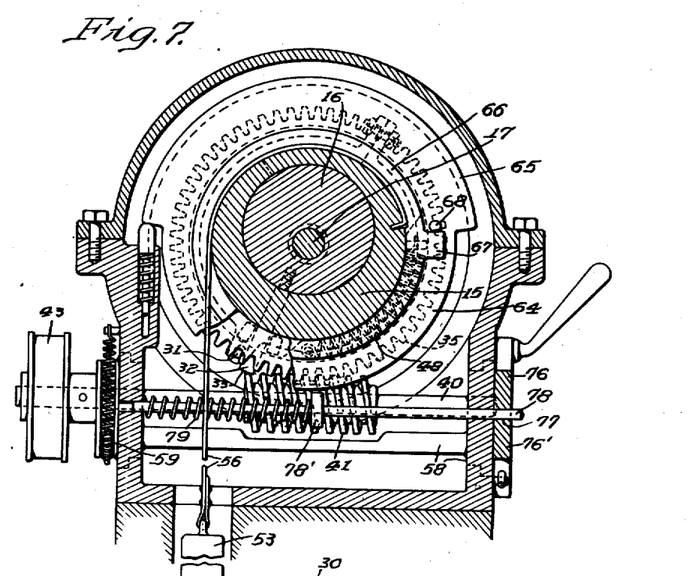
Fig. 7 is a transverse sectional view on the line 7—7 of Fig. 5
Figure 8:
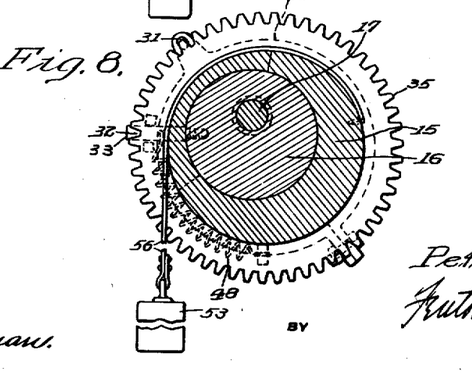
Fig. 8 is a view somewhat similar to Fig. 7 but showing an arrangement of parts of the embodiment illustrated in Fig. 5 capable of cutting external threads.

The embodiments of my invention illustrated in Figs. 5, 6, and 7 and in Fig. 8 constitute completely automatic machines illustrative of certain ways of reducing my invention to practice. In these embodiments, in addition to the use of automatic means for releasing the drive between the worm 41 and the gear 35, automatic means are provided for rotating the shaft 16 the proper amount to properly position the cutter 18 and return the same to normal position, while automatic means are also provided for giving the support 15 a reverse helical movement so that at the completion of a cycle of operations, the entire mechanism is brought back to normal position ready to repeat the operation. Any suitable mechanism for automatically moving the cutter 18 from normal position at dead center of the support 15 or from the normal position at the high point of the cutter 18 relative to the cylinder 15 may be provided.

Thus, in Fig. 5 I have shown the support 15 provided with an adjustable collar 30 thereon in turn provided with an offset projection 31. The shaft 16 has fixed thereto a pin 32 which moves in a slot in the cylinder 15 while this pin 32 is rotated by the worm gear 35, which in this case is loosely mounted on the cylinder 15. The worm gear 35 is rotated as in the other embodiments of my invention by the worm 41 on the shaft 40 and it will be seen that a rotation of the gear 35 will first rotate the pin 32 and consequently the eccentrically mounted shaft 16 before the end 33 of the pin 32 engages the projection 31 to rotate the fixed collar 30 on the cylinder 15. The cutter may, therefore be moved from the normal position relative to cylinder 15 to proper initial cutting position relative to the work being operated upon and an additional amount equal to get the required diameter of the threads cut. This will be done before the pin 32 engages the projection 31 to effect the helical movement of the rotating cutter. The time at which the pin 32 engages the stop or lug 31 determines the extent of the radial movement of the cutter relative to the shaft or cylinder 15, since as soon as this engagement takes place the shaft 16 and cylinder 15 rotate simultaneously and no relative adjustment of the cutter 18 radially of the cylinder 15 is effected. The angular position of the lug 31 may be determined by a rotation of the collar 30 on the cylinder 15 which adjusts the relative positions of the pin 32 and the lug 31 of the collar 30. To facilitate this adjustment, a scale 50' may be placed on the surface of the collar 30, coöperating with which is an arrow 51 on the cylinder 15. The collar is fixed in any adjusted position.

Any means may be used to return the cutter 18 to normal position relative to the cylinder 15 after the end of the cycle of operations has been reached and all the threads have been cut. One suitable means for this purpose consists of a spring 48 attached to the gear 35 and to the cylinder 15 so that the same will rotate the shaft 16 in a reverse direction to bring the tool 18 to substantially the dead center of cylinder 15 as soon as the driving connection between the worm 41 on the worm shaft and the worm gear 35 has been released. Moreover, a weight 53, attached to a fixed band 56 on the cylinder 15, may be located so as to be raised by the forward helical movement of the cylinder 15 during which movement the band 56 is wound upon the cylinder. Upon a release of the forward driving power for the cylinder 15, the weight 53 returns the cylinder 15 to initial position by reversely rotating the same.

As shown in Fig. 7, a somewhat slightly modified means for releasing the engagement between the worm 41 and worm gear 35 is used. In this case the ring 66 is secured to the cylinder 15 rather than connected to the gear 35 as shown in Figs. 3 and 4. The auxiliary ring 64 is loosely mounted on the cylinder 15 as before and upon a rotation of the cylinder and consequently the ring 66, the lug 67 thereof engages the pin 68 of the ring 64 to rotate the same and carry the projection 65 around to a position to trip a releasable mechanism which holds the worm 41 in mesh with the worm gear 35. The worm shaft 40 is eccentrically mounted in the rotatable bearing support 58 with which a coil spring 59 coöperates, as in the embodiment shown in Figs. 1 and 2, to so rotate the support 58 as to move the worm 41 out of engagement with the worm gear 35. The supporting shaft 58 is provided with a plate 76' which may be located outside of the casing as shown in Fig. 7, and provided with an opening 77 through which a pin 78 is normally projected by the coil spring 79 interposed between a wall of the casing and a collar 78' fixed to the pin 78. From this construction it will be apparent that when the projection 65 on the ring 64 is carried around by the engagement of the lug 67 with the pin 68 on ring 64, the same will engage the collar 78', retracting the pin 78 from engagement with the plate 76 and contracting the coil spring 79. With the pin 78 released from the opening 77 in the plate 76, the spring 59 is immediately free to rotate the eccentric support 58 from the worm shaft 40 so as to disengage the worm 41 from the gear 35, as will be apparent from an inspection of Figs. 6 and 7. The weight 53 heretofore referred to may then operate to automatically return the cylinder 15 to initial position.

Attention is called to the fact that in the embodiment shown in Fig. 5, the master thread 46 and the master nut 47 are located at the end of the casing and are consequently readily accessible to facilitate changing them. One means for securing the master thread 46 to the cylinder 15 to facilitate the removal therefrom, is shown in Fig. 6. In this case the cylinder 15 may be provided with a plurality of recesses 15', only one of which is shown in Fig. 6. The double-headed bolt 47' is adapted to engage a lug on the master thread 46 between its heads and by providing the bolts 47' with suitable wrench engaging openings, it will be seen that the same may be screw threaded into and out of the cylinder 15 at the bottom of the recesses 15' to apply or remove a master thread 46.

The operation of the embodiment of my invention illustrated in Figs. 5 and 7 will, it is believed, be readily understood. In these cases the casing 10 is properly positioned relative to the work being operated upon and the tool 18 is at the dead center of the cylinder 15, as shown in full lines in Fig. 7. After ascertaining the proper distance which it is necessary to move the cutter 18 radially to get the proper depth for the threads, the adjustable collar 30 is clamped to the cylinder 15 in the proper position as indicated by the scale 50' to bring the offset projection 31 into proper position to be engaged by the end 33 of the pin 32. The worm 41 is releasably secured in engagement with the worm gear 35 by proper manipulation of the plate 76 by the operator, for which purpose a suitable handle may be provided. The pin 78 will be projected into the opening 77 in the plate 76 as has heretofore been described. Upon an application of power to rotate the worm shaft 40, the worm 41 thereon drives the worm gear 35 which carries with it the pin 32. This will effect a rotation of the shaft 16 relatively to the cylinder 15 until the pin 32 contacts with the projection 31 on the collar 30 when the cylinder 15 begins to rotate and is given a forward helical movement by reason of its rotation and the master thread 46 and nuts 47 as in the embodiment illustrated in Figs. 1 and 2. By the initial free rotation of the shaft 16 independently of the cylinder 15, it will be seen that the cutter 18 is moved transversely from the dead center to the proper position for the diameter of the threads, the limit of this movement being determined by the engagement of the pin 32 with the offset projection on the collar 30 which causes the cylinder 15 to rotate with the shaft 16 and no further relative movement between the two is effected. Thereupon, the cylinder 15 begins to rotate to give the cutter a helical movement relative to the work. When the end of the helical drive of the cutter 18 has been reached, the projection 65 on the ring 64 has been moved by the ring 66—by reason of the engagement of the lug 67 with the pin 68—to trip the collar 78' and remove the pin 78 from the opening 77 in the plate 76, whereupon the spring 59 rotates the eccentric support 58 to move the worm 41 out of engagement with the gear 35. The spring 48, which is connected at one end to the gear 35 and at the other end to the cylinder 15, has been placed under tension by the initial relative movement between the shaft 16 and the cylinder 15. As soon as the driving worm is automatically released from engagement with the gear 35, the spring 48 is free to rotate the same, and consequently the pin 32 and shaft 16, in a reverse direction to return the cutter 18 to dead center of the cylinder 15 or substantially such position. The weight 53, connected to the cylinder 15 through the band 56 which has been raised during the forward helical drive of the cylinder 15 which winds tne band 56 therearound, also operates to rotate the cylinder 15 to give the same a reverse helical drive by reason of the engagement between the master thread 46 and the nut 47. Thus, the spring 48 and weight 53 operate as a means for returning the cutter 18 to initial starting position. With the parts in this position the worm gear 41 may be reset into engagement with the gear 35 by a rotation of the plate 76 by the operator and the operation just described may then be repeated.

By providing a plurality of cutters 18, it will be seen that this mechanism provides a simple and effective combination of elements for milling a plurality of threads simultaneously but merely a single cutter may be used and the same given a plurality of turns by the cylinder 15. It will be evident, also, that by use of a different kind of tool 18 a surface may be milled or machined in any manner, dependent upon the character of tool used, and the mechanism is not limited to the milling of threads. Moreover, by reason of the fact that the shaft 17 is eccentrically mounted in the shaft 16 and the shaft 16 is likewise eccentric in the cylinder 15, the shaft 17 may be brought upon the dead center of the cylinder 15 and then the device could be operated as a drill, if desired, by placing a proper tool in the shaft 17 and using the rotation of the cylinder 15 to obtain the longitudinal feed of the tool. Various other uses of the mechanism disclosed will readily suggest themselves to those interested. In some instances it might not be necessary to mount the shaft 16 eccentrically of the cylinder 15 as the same could be concentric thereto, in which case with the shaft 17 eccentric of the shaft 16, the mechanism could be used in this fixed position to obtain the helical movement of the tool while the adjustment of the work as well as the means for obtaining the depth of the thread could be effected by a movement of the work operated upon.

The mechanism illustrated in Fig. 8 is substantially the same as that shown in Figs. 5, 6 and 7 excepting that the cutter 18 is normally positioned at the high point of its path of movement relative to the cylinder 15 and this arrangement is intended for use in cutting entirely automatically external threads. In this case the spring 48 may be attached to the pin 32 at one end and the cylinder 15 at the other, the lug 31 is adjusted as before and initial rotation of the gear 35 first rotates the shaft 16 independently of the cylinder 15 to move the cutter 18 and cutter shaft 17 inwardly toward the center of the cylinder 15. This will continue until the end 33 of the pin 32 strikes the projection 31 which is connected to the cylinder 15 and thereupon the cutting tool will be given a helical movement as in the other embodiments. At the end of the cycle of operations the return of the elements of the mechanism to their normal position will be effected in the same manner as in the embodiment of Figs. 5, 6 and 7 as will be readily understood.

Figure 9:
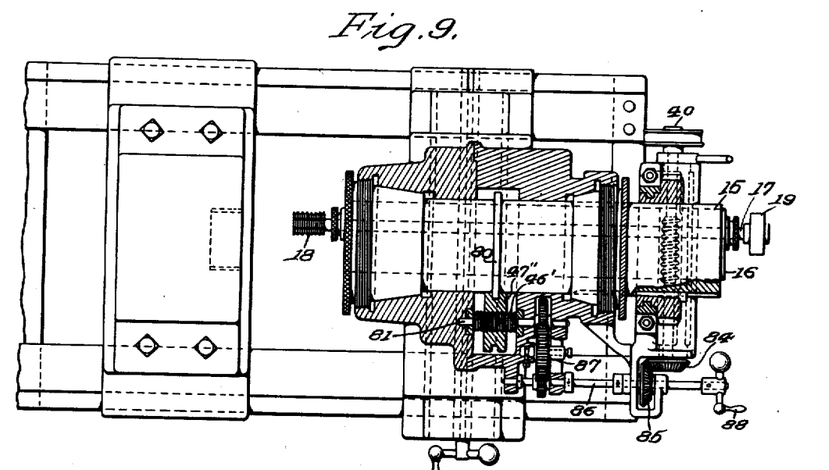
Fig. 9 is a further modification of the invention illustrated in Figs. 1 and 2, while Figs. 10 and 11 each represent further modifications of the arrangement of parts for carrying my invention into effect.

In Fig. 9 I have illustrated a modified embodiment of my invention. The changes include, among others, the manner in which the variations in the pitch of the thread cut may be obtained by changing gears instead of changing the lead nut 47 shown in the embodiment of Figs. 1 and 2. In such case a fixed lead nut is used and the change in pitch obtained by varying the speed with which a lead screw revolves to move the cylinder 15 longitudinally during the revolution or rotation thereof. Thus, in Fig. 9, I have shown the cylinder 15 which carries the eccentric 16 and the shaft 17 as before, provided with a rib 80 adapted to be engaged by an externally grooved lead nut 47″ which is fed by the master screw thread 46′ on an auxiliary screw shaft 81 mounted in the casing 10 and 11. A further change made here is that the worm shaft 40 which revolves the cylinder 15 is located in the embodiment of Fig. 9 adjacent one end of the casing of the mechanism and may be substantially independent thereof or supported therefrom by brackets 83. The worm shaft 40 is provided with a miter gear 84 adapted to engage a miter gear 85 to drive the shaft 86. From the shaft 86 the power is transmitted by a series of change gears 87 to the shaft 81 which carries a master thread 46′. Any type of change gear mechanism 87 may be employed. The shaft 86 may be provided with a handle 88 to return the cylinder to its original position longitudinally of the machine after the automatic releasing mechanism has disengaged the driving shaft 40 from engagement with the worm wheel 35. When this disengagement takes place, the miter gear 84 moves away from the miter gear 85 and leaves the shaft 86 free to be rotated by the handle 88. From an inspection of Fig. 9 it will be seen that this embodiment shows the location of the worm shaft 40 at one end of the mechanism rather than centrally thereof as in Fig. 1. Moreover, it will be seen that while the work is shown as fixed in this embodiment, yet the longitudinal feed of the cylinder 15 could be readily transferred to a feeding of the work support to obtain the same results.

Figure 10:
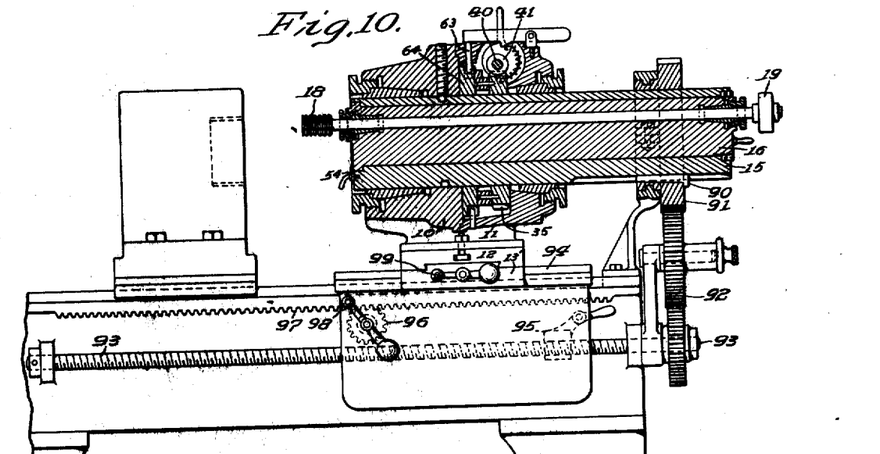

In Fig. 10 there is illustrated another embodiment of my invention wherein the mechanism is shown as applied to a screw lathe and the longitudinal feed of the milling cutter is obtained by the ordinary feed screw mechanism of such a lathe. In this case, the cylinder 15 and the parts carried thereby do not move longitudinally of the casing but the casing, through its supporting plates, is moved to obtain the same results. The cylinder 15 is made to revolve within the casing by the worm on the worm shaft 40 engaging the worm gear 35 on the cylinder 15 as in Fig. 1. Splined to the cylinder 15 by a key 90 is a gear 91 adapted to be rotated by the cylinder 15, the gear 91 being connected by the change gear mechanism 92 to the screw feed shaft 93. The sliding carriage 94, which supports the plates 12 and 13' as well as the casing 10 and 11 of the mechanism, is provided with a releasable feed nut 95 normally held in engagement with the lead screw 93. It will thus be seen that as the shaft 93 is rotated by the power drive from the rotation of the cylinder 15 and transmitted through a changeable gear mechanism 92, the same operates on the nut 95 to feed the carriage 94 longitudinally and attain the pitch of the threads. In this instance it will be seen that there is a relative helical movement between the rotating cutter 18 and the work being operated upon. When the work has been completed, the lead nut 95 is released and the pinion 96 of the rack 97 rotated by the handle 98 to return the carriage 94 to initial position, the worm 41 having been disengaged in the meantime.

Figure 11:
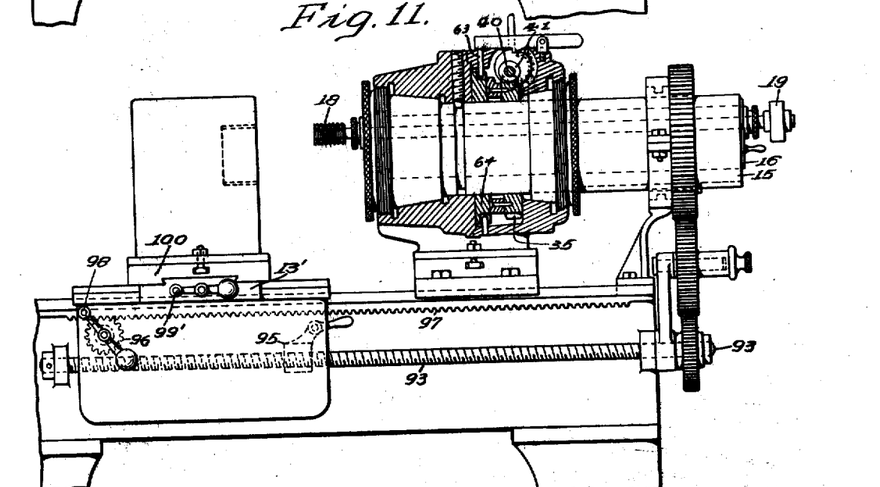

The mechanism illustrated in the embodiment of Fig. 11 corresponds generally to that of Fig. 10 with the exception that the lead screw 93 is used to move the work support 100 to obtain the relative movement between the cutter 18 and the work necessary to give the pitch to the threads when the device is used for milling threads or to give the necessary relative feed between the work and the tool when any other kind of machine tool is used. In this case the casing 10 is fixed to the bed of the machine and the screw handle 99' on the bed plate 13' under the work may be operated to bring the work and cutter into initial cutting position and then operated to feed the work transversely to a fixed stop to obtain the correct diameter of the threads cut. The proper manipulation of the parts to effect the required results will thus be apparent to those skilled in the art. Moreover, the automatic transverse feeding mechanism illustrated in Fig. 5 may be applied to the cylinder 15 in Fig. 7 and in this case a manipulation of the handle 99' for moving the work to obtain the depth of the threads would be unnecessary.

Having thus described my invention, I claim and desire to protect by Letters Patent of the United States:—

1. In a metal working mechanism, the combination of a cutter adapted to simultaneously cut a plurality of threads in a piece of work, means to rotate said cutter about its axis, automatically operated means to cause a relative transverse movement between said cutter and the work to cause the cutter to be moved into the work the required depth for the thread and automatically operated means to cause a relative helical drive between said cutter and said work, and automatically operated means to release and return the two last-mentioned means to initial starting position.

2. The combination of a multiple cutter cutting tool, means to rotate said cutting tool about its axis, automatically operated means to effect a helical movement of said cutting tool relative to the work to be operated upon and means to automatically release and return said last-mentioned means.

3. The combination of a cutting tool, means to rotate said cutting tool about its axis, automatically operated means to cause said cutting tool to move toward the work operated upon to cause the cutter to enter the work for cutting the threads, automatically controlled means to limit said movement at the proper depth for the threads, automatically operated means to effect a helical movement of said cutting tool relative to said work and automatic means to withdraw said cutting tool from said work and means to automatically return the helically moved means to initial position.

4. The combination of a multiple cutter cutting tool, means to rotate said cutting tool about its axis, automatically operated means to cause said cutting tool to move toward the work operated upon including means to limit the entry of said cutting tool into the work the proper depth to get the correct diameter of the threads, automatically operated means to effect a helical movement of said cutting tool relative to said work, means to automatically release and return said last-mentioned means to initial starting point and means to automatically return the cutter to initial starting position.

5. The combination of a multiple cutting tool, automatically operated means to cause said cutting tool to move toward the work operated upon to bring the cutter to initial cutting position, including means to limit the entry of said cutting tool into the work the proper depth for the threads, automatically operated means to effect a helical movement of said cutting tool relative to said work in one direction, automatically operated means to release said last-mentioned means, automatically operated means to withdraw said cutting tool from said work, and means to effect a helical movement of said cutting tool relative to said work in the opposite direction.

6. In a thread cutting mechanism, the combination of a support, a shaft mounted eccentrically in said support, a multiple cutter mounted eccentrically in said shaft, means to drive said multiple cutter about its axis, automatically operated means to rotate said shaft to bring said rotary cutter into the work the depth for the thread and automatically operated means to rotate said support to give said multiple cutter a planetary movement about said work and helical means secured to said support and mechanism for simultaneously giving said support a linear movement, automatically operated means to release said third-mentioned means including means to automatically withdraw said cutter from said work and helically return said cutter to initial starting position.

7. In a multiple thread cutting mechanism, the combination of a cylindrical and rotatable support, a shaft mounted eccentrically in said support, a second shaft mounted eccentrically in said first-mentioned shaft, a multiple cutter carried by said second-mentioned shaft, means to rotate said second-mentioned shaft and said cutter, automatically operated means to rotate said first-mentioned shaft in said support to adjust said cutter relative to the work to be operated upon, automatically operated means to rotate said support and means connected to said support and said mechanism to cause the support, the first and second shafts and the cutter to be fed longitudinally during the rotation of said support, automatic means to release the means rotating the support, and means to automatically return said cutter, said shafts and said support to initial starting position.

8. In a thread milling mechanism, the combination of a rotary support, a rotary shaft mounted eccentrically in said support, a rotary cutter mounted eccentrically in said shaft, said cutter being provided with a plurality of cutting members adapted to cut a plurality of threads simultaneously, means to rotate said cutter, automatically operated means to rotate said shaft, automatically actuated means to move said cutter, shaft and support longitudinally during the rotation of said cutter and automatically operated means to rotate said support with said shaft and cutter to revolve said cutter in an orbital path, and automatic means to discontinue the rotation of the support, means to simultaneously rotate and longitudinally move said support with said shaft and cutter in reverse direction including means to rotate said shaft in said support in reverse direction and manually operative means to engage said automatic means for rotating the support with the shaft and cutter.

9. The combination of a rotatable support, a rotatable shaft mounted eccentrically therein, a rotary multiple cutter eccentric of said shaft, automatic means to rotate said shaft in one direction to move the cutter transversely relative to the work being operated upon, means to simultaneously effect a forward helical movement of said cutter and said work, automatic means to effect a reverse helical movement of said shaft and cutter relative to said work and automatic means to rotate said shaft in said support in the opposite direction whereby said cutter will be returned to initial starting position.

10. In a planetary metal working machine having a rotatable support and means to rotate said support, automatic means for releasing the connection between said rotatable support and said rotating means, including normally restrained means for moving said rotating means out of engagement with said rotatable support, means for holding said rotating means and rotatable support in operative relation and automatic means for releasing said holding means and said normally restrained means.

11. In a planetary metal working machine having a rotatable support adapted to be driven by a gear, a coacting gear for driving said first-mentioned gear, means for eccentrically mounting said last-mentioned gear, automatic means for rotating said mounting to move said gears out of operative engagement, means for normally holding said eccentric mounting in position with said gears in engagement and automatically actuated means for releasing said last-mentioned means.

12. In a planetary metal working mechanism, the combination with driving means therefor, of means to release said driving means after a predetermined amount of rotation of said planetary metal working mechanism, including a releasing mechanism, said releasing mechanism including a member independent of said planetary mechanism and a member driven by said planetary mechanism adapted to engage said first-mentioned member upon a predetermined rotation of said planetary mechanism to move the same and trip a means for holding a driving mechanism in operative relation with the planetary mechanism.

13. The combination of a rotary multiple cutting tool, means to rotate said cutting tool about its axis, automatic means to move said cutting tool into and out of cutting engagement with the work operated upon, automatic means to revolve said cutting tool in a planetary path about said work, automatic means to simultaneously and uniformly advance said cutting tool in a linear direction parallel to said axis, automatic means for rendering inoperative said revolving means after completion of a planetary circuit, means for linearly returning the cutting tool to initial starting position.

14. The combination of a rotary multiple cutting tool, means to rotate said cutting tool about its axis, automatically operated means to move said cutting tool in cutting engagement with the work operated upon, including means to limit the entry of said cutting tool into said work the proper depth to obtain the correct diameter of the threads, automatically operated means to effect a helical movement of said cutting tool relative to said work, means to automatically release said last-mentioned means, automatic means to disengage said cutting tool from said work and means for linearly returning said cutting tool to initial starting position.

15. In a planetary metal working mechanism, the combination with driving means therefor, a rotary driven member driven thereby, a rotary support, a rotary shaft eccentrically mounted in said support, a rotary cutter eccentrically mounted in said shaft, means for operatively connecting said driven member with said shaft for rotating said shaft through a predetermined amount of rotation of said driven member, means secured to said support for operative engagement with said driven member for rotation of said support through a further predetermined amount of rotation of said driven member after said first predetermined amount of rotation of said shaft and driven member, means for releasing the driving means from the driven member at the limit of rotation of said support, means carried by said support for actuating said releasing means, means for returning said support, shaft and driven member to the initial starting position, including means to limit the reverse rotation of said support, shaft and driven member at said position, means connected to said support and said mechanism for simultaneously imparting a longitudinal travel forwardly and backwardly to said support, shaft, and cutter during said predetermined and reverse rotations respectively, and means to rotate said cutter.

16. In a planetary metal working mechanism, the combination with driving means therefor, of means to normally maintain said driving means in operative engagement with said planetary mechanism, of means to release said driving means after a predetermined amount of rotation of said planetary mechanism, including a releasing mechanism, said releasing mechanism including a member independent of said planetary mechanism and a member driven by said planetary mechanism adapted to engage said first-mentioned member upon a predetermined rotation of said planetary mechanism to move the same and trip the means for holding the driving mechanism in normal operative relation with the planetary mechanism, and means for moving said driving means into operative engagement with said planetary mechanism, including means for engagement with said independent member whereby said member maintains said movable means in locked position for maintaining the driving means in normal operative engagement.

In witness whereof I have hereunto set my hand this fifth day of June, A. D. 1918.

PETER P-G. HALL.

It is hereby certified that in Letters Patent No. 1,316,718, granted September 23, 1919, upon the application of Peter P-G. Hall, of Philadelphia, Pennsylvania, for an improvement in "Planetary Metal-Working Machines," errors appear in the printed specification requiring correction as follows: Page 1, line 20, second occurrence, for the word "of" read *or;* page 7, line 105, claim 4, for the word "point" read *position;* and that the said Letters Patent should be read with these corrections therein that the same may conform to the record of the case in the Patent Office.

Signed and sealed this 6th day of January, A. D., 1920.

[SEAL.]

M. H. COULSTON,
*Acting Commissioner of Patents.*

Cl. 10—154.